US012800100B2

(12) United States Patent
Lee

(10) Patent No.: US 12,800,100 B2
(45) Date of Patent: Nov. 17, 2026

(54) BATTERY-TYPE AUTOMATIC GREASE GUN

(71) Applicant: AHWON CORPORATION, Gunpo-si (KR)

(72) Inventor: Juho Lee, Gwacheon-si (KR)

(73) Assignee: AHWON CORPORATION, Gunpo-si (KR)

(*) Notice: Subject to any disclaimer, the term of this patent is extended or adjusted under 35 U.S.C. 154(b) by 104 days.

(21) Appl. No.: 18/990,092

(22) Filed: Dec. 20, 2024

(65) Prior Publication Data

US 2025/0207722 A1 Jun. 26, 2025

(30) Foreign Application Priority Data

Dec. 21, 2023 (KR) ........................ 10-2023-0188549

(51) Int. Cl.
*F16N 5/00* (2006.01)
*F16N 19/00* (2006.01)

(52) U.S. Cl.
CPC ............. *F16N 5/00* (2013.01); *F16N 19/003* (2013.01); *F16N 2250/40* (2013.01); *F16N 2270/10* (2013.01)

(58) Field of Classification Search
CPC ...... F16N 5/00; F16N 19/003; F16N 2250/40; F16N 2270/10; F16N 3/12; F16N 11/08; F16N 13/08
USPC ........................................................... 222/63
See application file for complete search history.

(56) References Cited

U.S. PATENT DOCUMENTS 2,694,508 A * 11/1954 Petrenchak ............... F16N 3/12 222/323
2,844,287 A * 7/1958 Brandt ...................... F16N 3/12 222/326
3,286,887 A * 11/1966 Sundholm ................. F16N 3/12 222/386
3,391,829 A * 7/1968 Gregory .................... F16N 7/32 239/313
4,257,540 A * 3/1981 Wegmann ................. F16N 3/12 222/262
5,188,259 A * 2/1993 Petit .................... B05C 17/0103 222/326
6,135,327 A * 10/2000 Post .......................... F16N 3/12 222/333
6,290,106 B1 * 9/2001 Kuo .................. B05C 17/00569 222/256

(Continued)

FOREIGN PATENT DOCUMENTS

KR 101278083 B1 * 6/2013 ............... F16N 3/12
KR 20-0477638 Y1 7/2015
KR 20180111353 A * 10/2018 ....... B05C 17/00569

*Primary Examiner* — Vishal Pancholi

(74) *Attorney, Agent, or Firm* — Heedong Chae; Lucem, PC

(57) ABSTRACT

One aspect of the present disclosure relates to a battery-powered automatic grease gun, which includes: a driving unit including a motor and a gear, configured to provide piston motion to a piston (P); a distribution unit extending from the driving unit and receiving the piston motion, into which the piston is inserted; a grease container assembly coupled to the distribution unit and configured to store grease; and a spray nozzle and a grease nipple, which are a plurality of discharge ports connected to the distribution unit.

5 Claims, 9 Drawing Sheets

(56) References Cited

U.S. PATENT DOCUMENTS

| | | | | | |
|---|---|---|---|---|---|
| 7,032,713 | B2 * | 4/2006 | Huang | F16N 11/08 | 222/263 |
| 2006/0091161 | A1 * | 5/2006 | Cen | F16N 3/12 | 222/333 |
| 2009/0184138 | A1 * | 7/2009 | Shew | G01F 11/029 | 74/119 |
| 2009/0255760 | A1 * | 10/2009 | Prest | F16N 3/12 | 248/683 |
| 2013/0087583 | A1 * | 4/2013 | Thorson | F16N 29/04 | 222/333 |
| 2014/0291354 | A1 * | 10/2014 | Thorson | F16N 11/04 | 222/153.13 |
| 2015/0060496 | A1 * | 3/2015 | Rudolph | F16N 3/12 | 222/189.11 |
| 2015/0069083 | A1 * | 3/2015 | Alekseyev | H02P 7/08 | 222/23 |
| 2015/0114991 | A1 * | 4/2015 | Alekseyev | F16N 11/08 | 222/23 |
| 2017/0098945 | A1 * | 4/2017 | Lee | B05B 11/1001 | |

* cited by examiner

BATTERY-TYPE AUTOMATIC GREASE GUN

BACKGROUND OF THE INVENTION

1. Field of the Invention

One aspect of the present disclosure relates to a battery-type automatic grease gun, and more particularly, to a battery-type automatic grease gun including two discharge ports, which are a spray nozzle and a grease nipple, and capable of performing selective discharge of the two discharge ports in different schemes.

2. Description of the Related Art

Nowadays, heavy equipment is being developed into expensive, multi-functional, and complex attachment-equipped equipment. However, a lubrication device that has a significant impact on performance and a lifespan of the heavy equipment is currently being supplied while being limited to an equipment main body lubrication function or an attachment lubrication function.

In particular, although selection of attachments with various complex functions is being rapidly developed in medium and small equipment, grease injectors oriented to conventional general grease injection functions or attachments and equipment main bodies are being selected and used for an automatic lubrication device.

This reality inevitably involves a decrease in equipment operation rates and lifespans of equipment and attachments, which leads to a decrease in cost-effectiveness of equipment.

To solve such problems, a complex automatic grease injection gun for small and medium equipment is being developed, and there is a growing need for a battery-type automatic grease gun with complex functions for small and medium equipment, capable of greatly contributing to increasing efficiency of a lubrication device, increasing performance of equipment and attachments, and extending lifespans of equipment and attachments, by allowing a spray function for equipment such as driving equipment, a wire crane, and a pile driver, which are combined with an equipment crane, a lift, a cargo crane, and the like having a slide boom with a wide area, and a function of continuously injecting a very small amount of grease to a hydraulic breaker, a chisel, and the like, and a function of individually injecting general grease to a main body lubrication portion, a rotation portion, and the like of equipment at a high pressure to be used for multiple purposes through one grease gun.

Documents of Related Art

[Patent Documents]

(Patent Document 0001) Korean Utility Model Registration No. 20-0477638 (published on Jul. 7, 2015), “Automatic lubricant injection gun using power of vehicle.”

SUMMARY OF THE INVENTION

To solve the problems described above, an object of the one aspect of the present disclosure is to provide a battery-type automatic grease gun including two discharge ports, which are a spray nozzle and a grease nipple, and capable of performing selective discharge of the two discharge ports in different schemes.

To achieve the object described above, according to one aspect of the present disclosure, there is provided a battery-type automatic grease gun including: a driving unit including a motor and a gear, and configured to provide a piston motion to a piston (P); a distribution unit extending from the driving unit, and into which the piston is inserted to receive the piston motion; a grease container assembly coupled to the distribution unit, and configured to accommodate grease; and a spray nozzle and a grease nipple, which are a plurality of discharge ports connected to the distribution unit.

In this case, the driving unit may include a breaker operation signal connector configured to operate the grease gun in a ‘breaker operation mode’ when a breaker operation signal is connected, and cancel grease injection when the breaker operation signal is disconnected.

In this case, the grease container assembly of the grease gun may be formed of a transparent or translucent material, and the grease container assembly may include a holder to which a magnet is attached.

In this case, the distribution unit may include a check-type air vent configured to allow air inside the grease container assembly to be discharged to an outside, and formed in a direction perpendicular to the piston.

In this case, the grease container assembly may be compatible with a ‘grease-refillable cartridge’ or a ‘bulk cartridge’, the ‘grease-refillable cartridge’ may have a transparent or translucent structure that is refillable a plurality of times, include upper and lower blocking covers, and include a cartridge air vent configured to prevent the grease from being filled further when the grease is refilled by a predetermined amount or more at a position adjacent to the upper blocking cover, and the grease container assembly may include a follower having a double seal structure so as to enable use of grease cartridges having different structures.

In this case, the battery-type automatic grease gun may further include a grease flowmeter, and the grease flowmeter may be configured to automatically stop the grease gun in a case where discharge is performed by a preset capacity or more when a user sets a predetermined discharge capacity.

According to one aspect of the present disclosure, a battery-type automatic grease gun may include two discharge ports, which are a spray nozzle and a grease nipple, and may be capable of performing selective discharge of the two discharge ports in different schemes, so that grease can be used at an appropriate position.

DETAILED DESCRIPTION OF THE INVENTION

Figure 1:
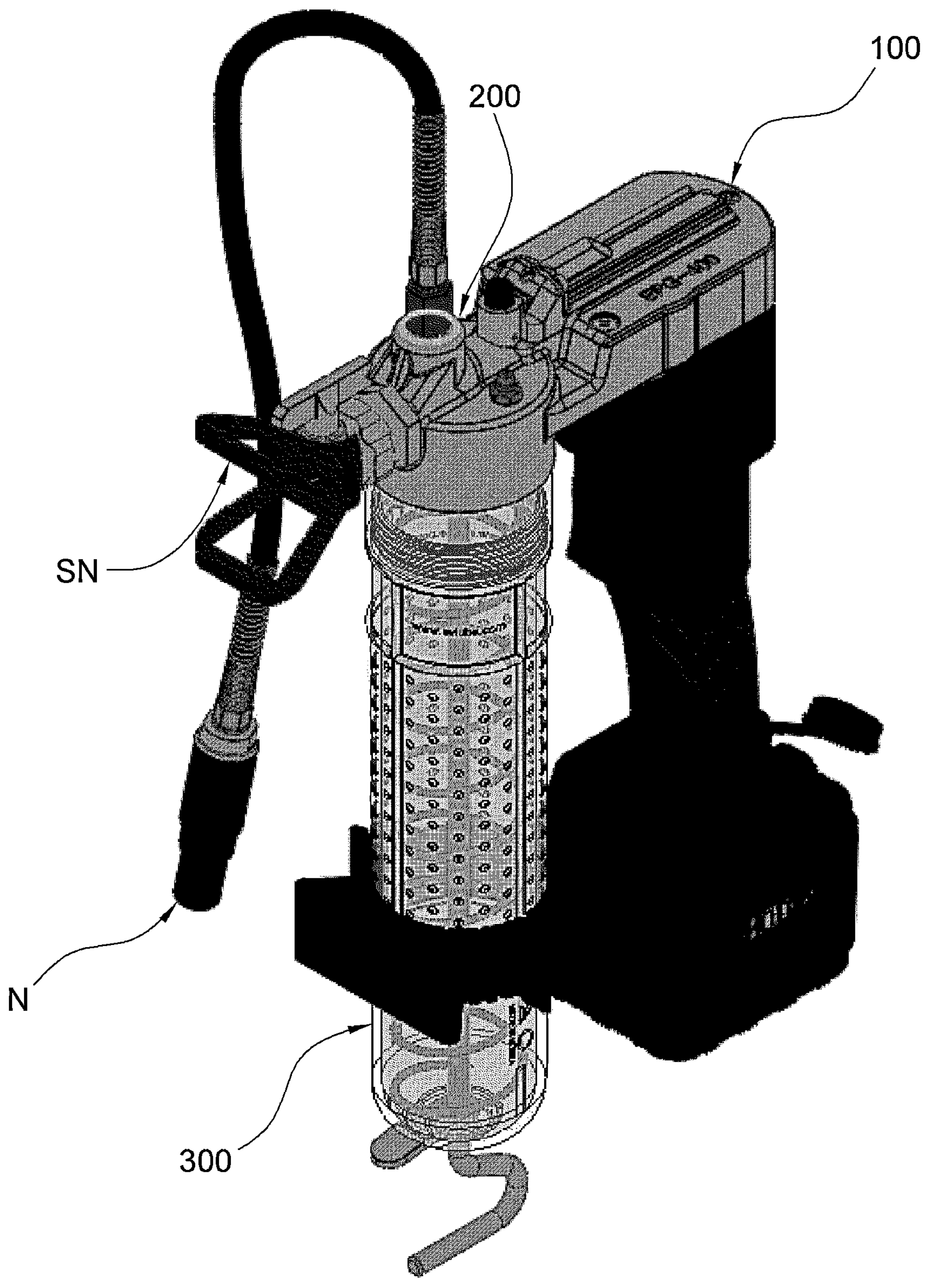
FIG. 1 is a perspective view showing a battery-type automatic grease gun according to an embodiment of the present disclosure.

The following detailed descriptions of the present disclosure are given for embodiments in which the present disclosure may be practiced, and refer to the accompanying drawings that illustrate the embodiments. These embodiments are described in sufficient detail to enable those skilled in the art to practice the present disclosure. It is to be understood that various embodiments of the present disclosure are different from each other, but need not be mutually exclusive. For example, specific shapes, structures, and characteristics described herein may be implemented and changed from one embodiment to another embodiment without departing from the idea and scope of the present disclosure. In addition, it is to be understood that positions or arrangements of individual elements in each embodiment described herein may be changed without departing from the idea and scope of the present disclosure.

Therefore, the following detailed description is not to be taken in a limiting sense, and the scope of the present disclosure is defined only by the appended claims while encompassing the scope of all equivalents of the claimed disclosure when appropriately described. In the drawings, like reference numerals refer to elements that perform the same or similar functions across various aspects.

Regarding the terms used herein, general terms that are currently used as widely as possible are selected in consideration of functions thereof in the present disclosure. However, the terms may vary according to the intention of those skilled in the art, judicial precedents, the emergence of new technologies, and the like. In addition, in certain cases, a term may be selected at discretion of the applicant. In this case, the meaning of the term will be described in detail at a corresponding part in the description of invention. Therefore, the terms used herein are to be defined based on the meanings of the terms and the overall contents of the present disclosure without being simply limited to names of the terms.

In the present disclosure, when some part "includes" some elements, unless explicitly described to the contrary, it means that other elements may be further included but not excluded.

Automatic grease guns are generally classified into a bulk-only type or a cartridge-only type according to a grease selection criterion, in which in a global reality, 1) a bulk type uses grease refilled from a grease barrel, while 2) a cartridge type uses grease filled in a disposable cartridge container and disposes of the disposable cartridge container after use. Accordingly, a battery-type automatic grease gun according to one aspect of the present disclosure may fundamentally prevent an environmental pollution source that is generated continuously.

In general, a lubrication device of equipment is divided into a main body and an attachment, and generally, a lubrication region of the main body of the equipment is periodically injected with grease automatically or manually during use of the equipment. Although some attachments are periodically and automatically injected with different types of special grease depending on a structure, performance, a working condition, and the like of the attachment, most attachments are manually injected with grease. Accordingly, the battery-type automatic grease gun according to one aspect of the present disclosure may be complexly used in the main body and the attachment.

In general, a power of a grease injection gun is supplied from a limited power source of equipment. Alternatively, a battery-charged grease gun uses an AC power source to recharge a battery. In addition, although batteries of various specifications are already distributed on the market, the batteries may not be used interchangeably, and only batteries from a grease gun manufacturer are used. Therefore, even for one piece of equipment, there are many cases where different types of grease are injected to an equipment main body and an attachment depending on a lubrication region. Accordingly, the battery-type automatic grease gun according to one aspect of the present disclosure may diversify a driving power source and an operation method of the grease gun.

Meanwhile, 1) in a case of using the cartridge type, various types of grease cartridges distributed on the market are generally used. In some cases, only limited cartridges from a grease cartridge manufacturer have to be used. In a case of using the bulk type, a grease container is generally inserted into grease inside a grease barrel, and the grease is directly sucked into a grease gun container for use. In this case, foreign substances may be inserted, and a grease residue may remain in the barrel, which may cause difficulties in subsequent processing of the grease residue. Accordingly, the battery-type automatic grease gun according to one aspect of the present disclosure may enable use of various types of grease used, and reduce the grease residue or waste after use to zero.

Meanwhile, 1) grease is manually applied to equipment such as a boom crane, a wire rope crane, or a forklift sliding surface, in which the grease has to be applied over a wide area. 2) Grease is manually injected to a hydraulic breaker that rapidly operates a high number of times within a short time, and a very small amount of grease is automatically injected to some extremely small number of breakers only when the breaker operates. However, grease injection to the equipment body is performed manually or performed by using a separate automatic grease injector. Accordingly, the battery-type automatic grease gun according to one aspect of the present disclosure may enable complex use by diversifying grease lubrication functions and methods.

Meanwhile, both manual and electric grease guns are generally stored in a separate storage location, and the grease guns are removed from the storage location upon use. However, some lubrication regions require a large amount of grease to be injected by holding the gun for a considerable amount of time, which is inconvenient and reduces efficiency. Accordingly, the battery-type automatic grease gun according to one aspect of the present disclosure may facilitate a method of attaching and storing the grease gun.

In addition, a grease container or a grease cartridge is generally formed of an opaque material, so that a remaining amount and an injection amount of grease in the grease container or the grease cartridge may not be recognized with a naked eye. Accordingly, the battery-type automatic grease gun according to one aspect of the present disclosure may allow the remaining amount of grease in a grease gun container to be recognized with a naked eye.

In general, a grease gun is configured such that a grease injection state is checked by perceiving operation noise of a driving unit and a pressure discharge status of a grease injection unit hose with the five senses during operation of the grease gun. Some electric grease guns are configured such that a grease injection amount and an injection operation status are checked by using an LCD window. Accordingly, the battery-type automatic grease gun according to one aspect of the present disclosure may allow a function of the grease gun to be checked before use.

When an electric grease gun is used in the bulk type, a small amount of air pockets may be introduced into the grease container. Even when the electric grease gun is used in the grease cartridge type, while there are no air pockets in the grease cartridge, air pockets are generated due to a pressure difference between a grease discharge pressure and a grease filling pressure during use. In the above case, when an air pocket control valve does not remove the air pockets in an optimal method at an optimal position, considerable inconvenience in use is caused, and efficiency of the electric grease gun is reduced. Accordingly, the battery-type automatic grease gun according to one aspect of the present disclosure may facilitate removal of air pockets.

In general, since an electric grease gun rapidly operates a considerably high number of times, an injection amount may not be controlled when an operation time is not controlled while a stroke/flow rate is fixed, so that an accurate amount may not be injected. Accordingly, the battery-type automatic grease gun according to one aspect of the present disclosure may be installed with a grease flowmeter.

In general, an electric grease gun has one discharge port, and grease is discharged through the one discharge port. Therefore, when a complex grease gun has two discharge ports, it is impossible to use only one discharge port for a selected function according to selection of the function. Accordingly, the battery-type automatic grease gun according to one aspect of the present disclosure may have double discharge ports.

Hereinafter, the battery-type automatic grease gun according to one aspect of the present disclosure will be described in detail with reference to the accompanying drawings.

Figure 2:
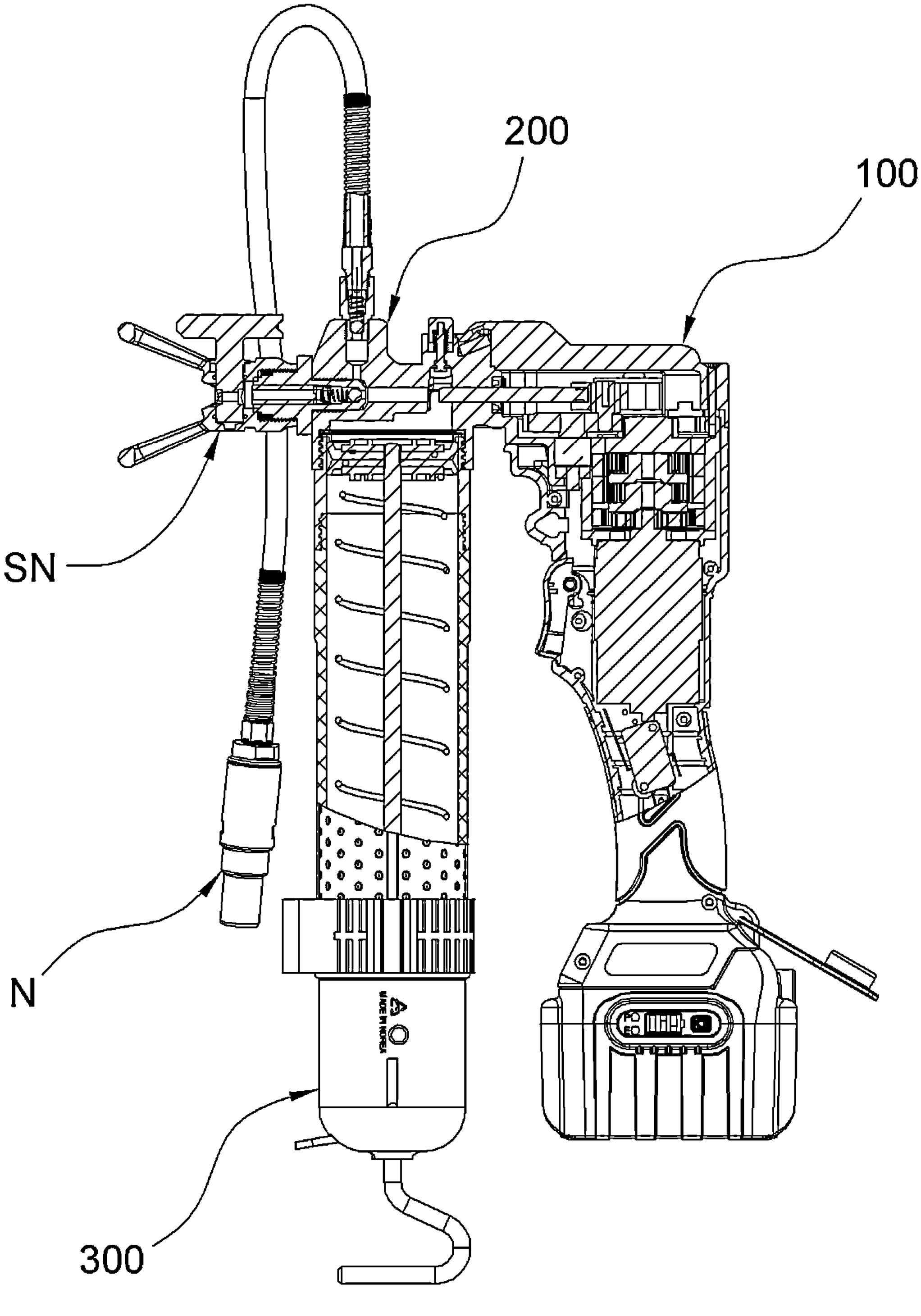
FIG. 2 is a sectional view showing the battery-type automatic grease gun according to the embodiment of the present disclosure.
Figure 3:
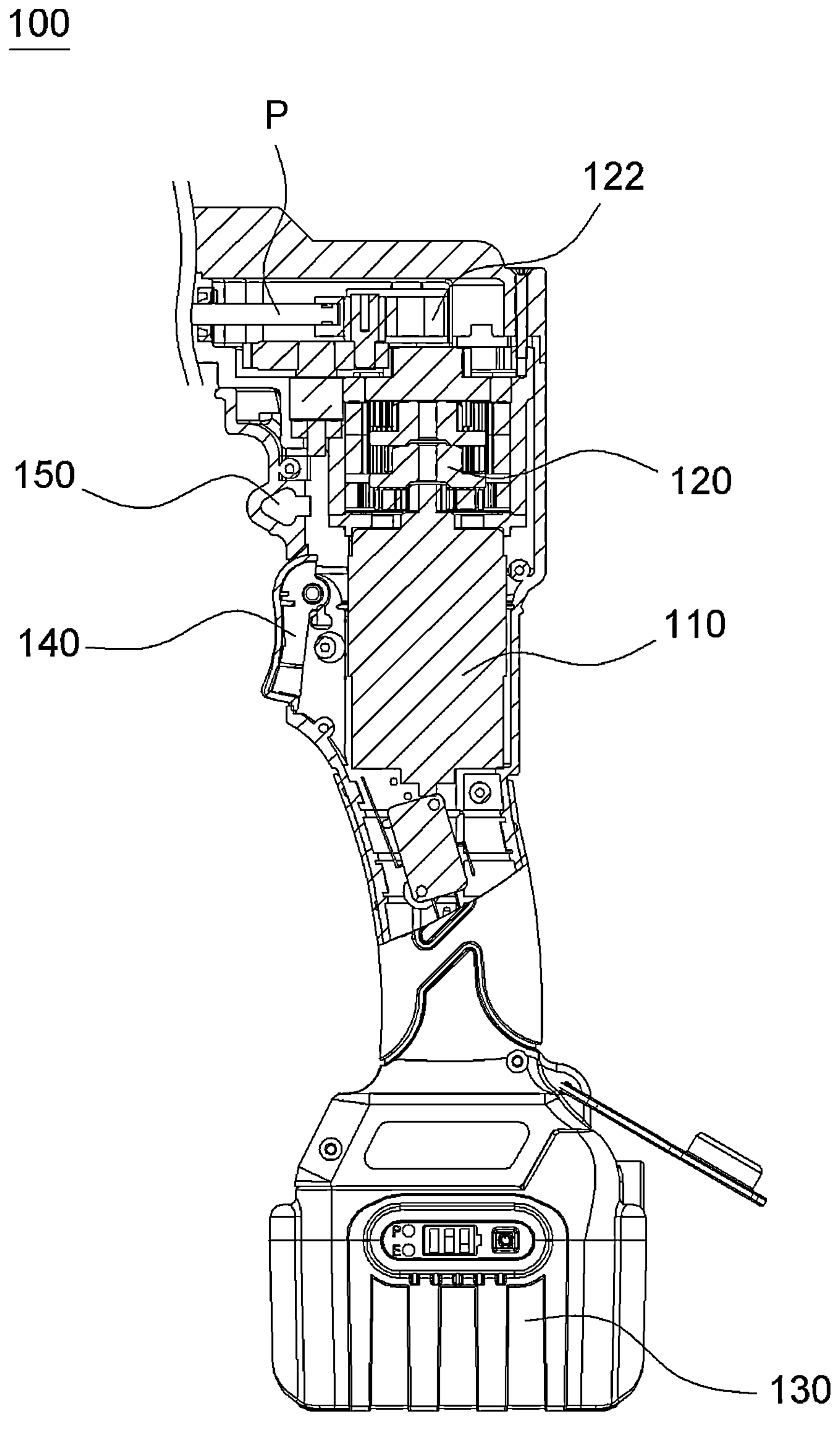
FIG. 3 is a sectional view showing a driving unit of the battery-type automatic grease gun according to the embodiment of the present disclosure.
Figure 4:
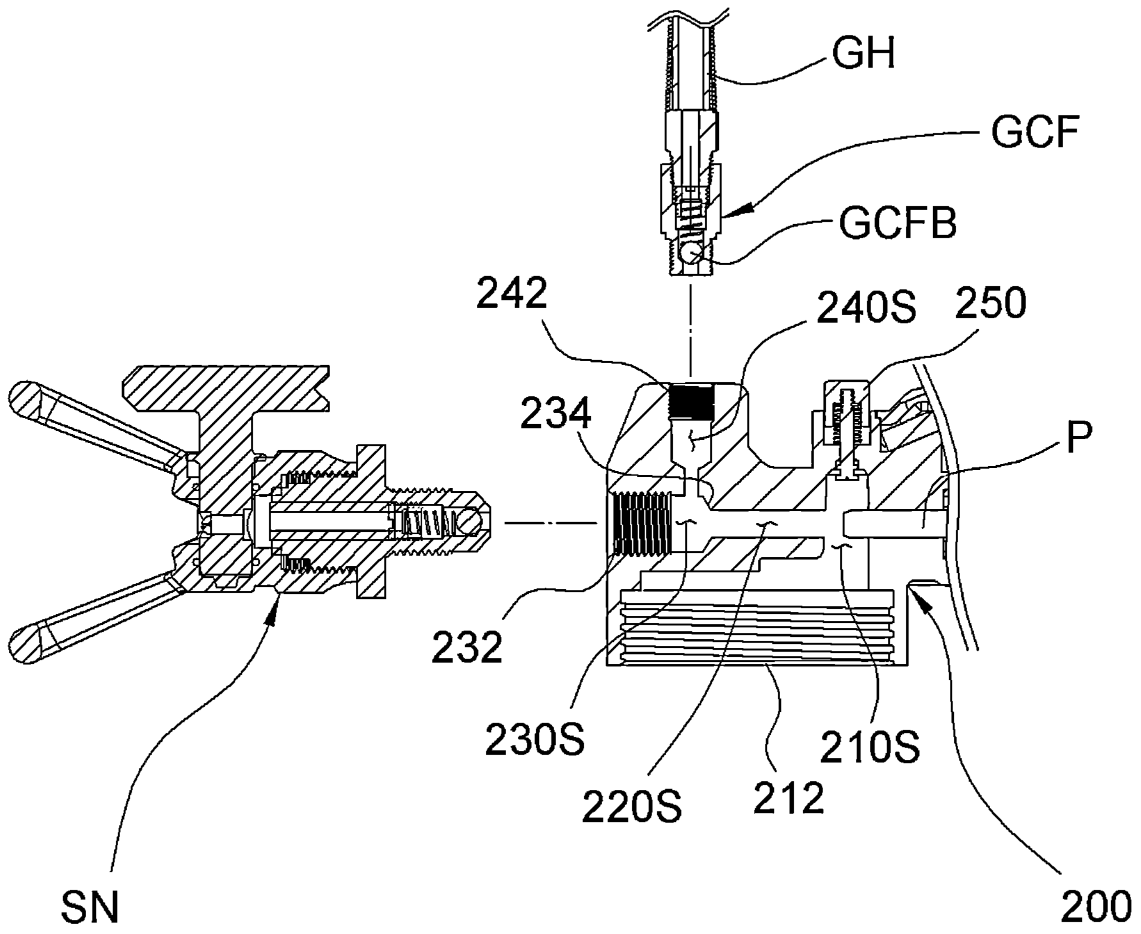
FIG. 4 is a sectional view showing a distribution unit of the battery-type automatic grease gun according to the embodiment of the present disclosure.
Figure 5:
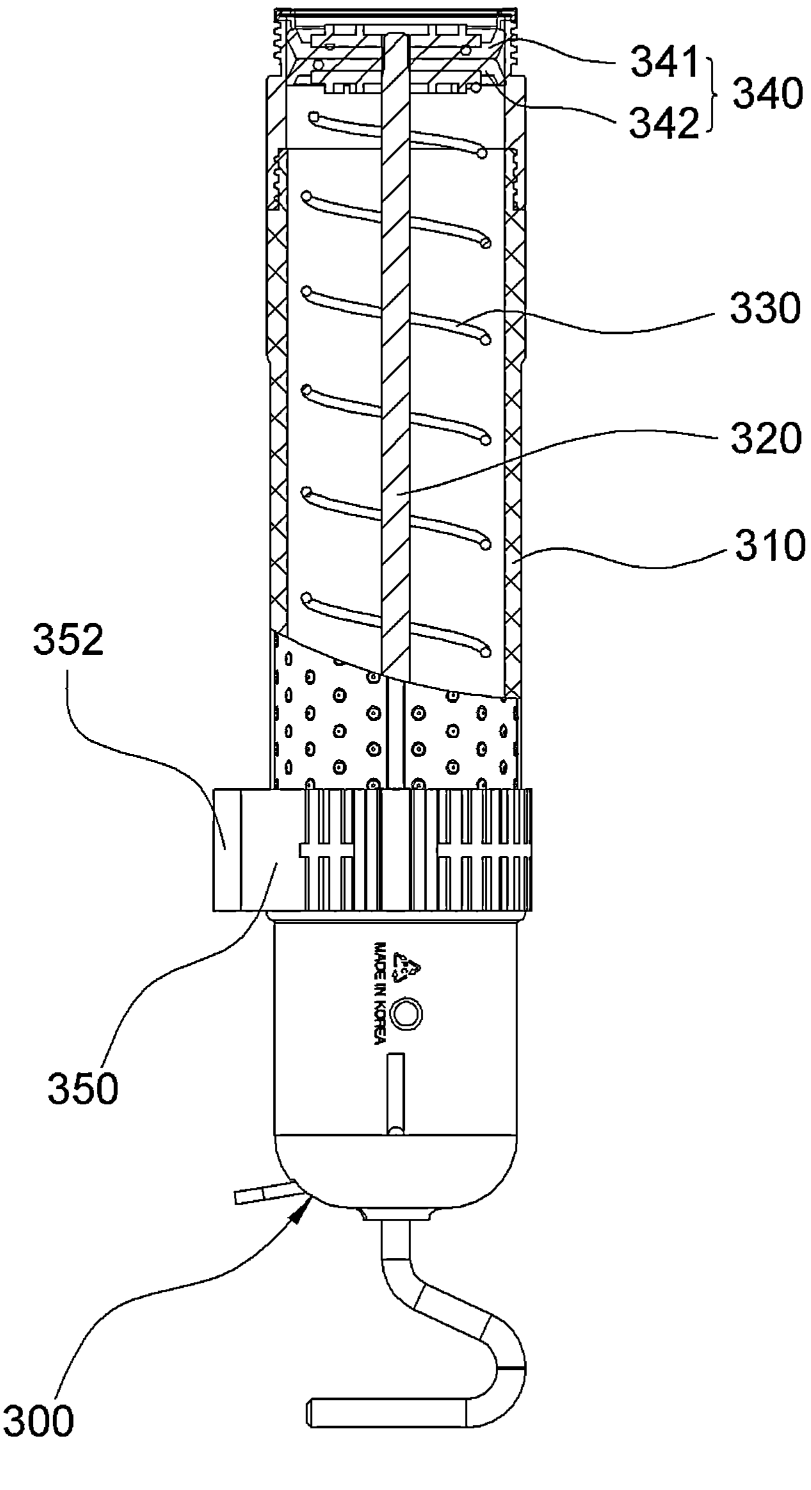
FIG. 5 is a sectional view showing a grease container assembly of the battery-type automatic grease gun according to the embodiment of the present disclosure.
Figure 6:
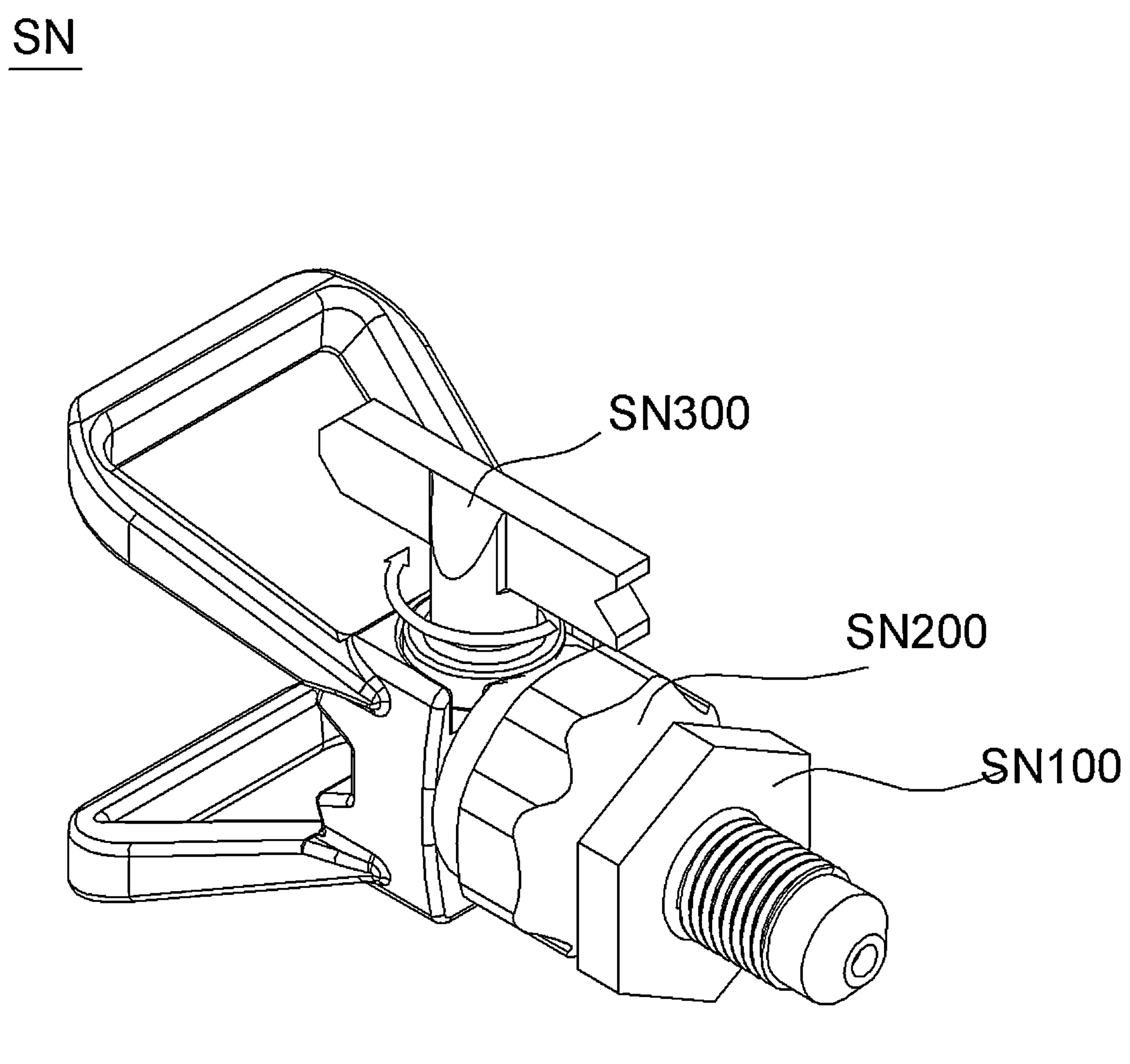
FIG. 6 is a perspective view showing a spray nozzle of the battery-type automatic grease gun according to the embodiment of the present disclosure.
Figure 7:
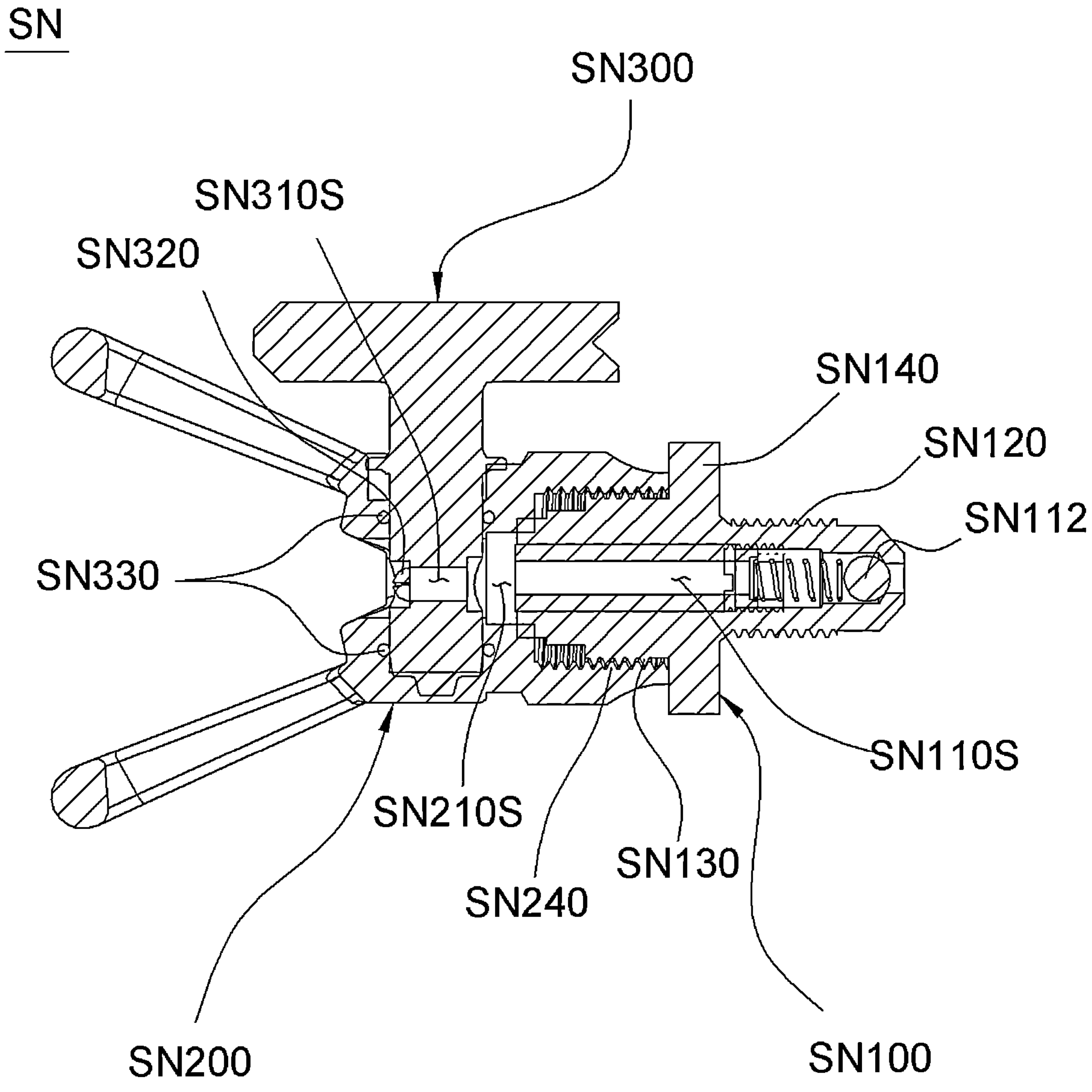
FIG. 7 is a sectional view showing the spray nozzle of the battery-type automatic grease gun according to the embodiment of the present disclosure.
Figure 8:
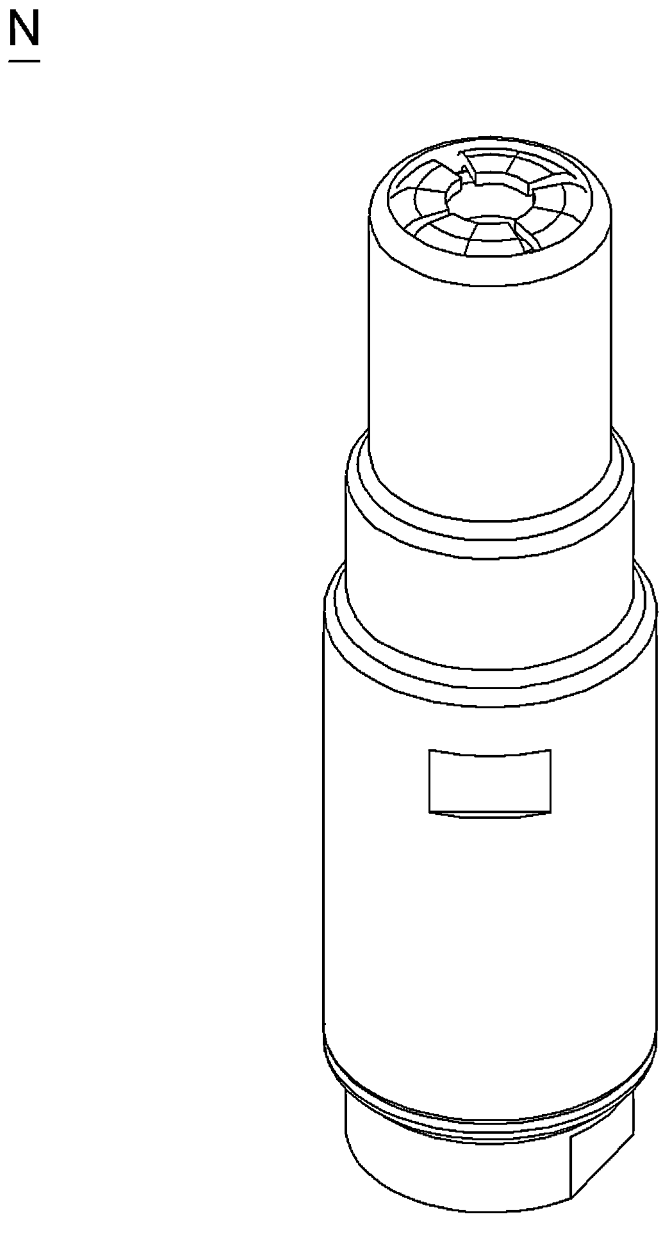
FIG. 8 is a perspective view showing a grease nipple of the battery-type automatic grease gun according to the embodiment of the present disclosure.
Figure 9:
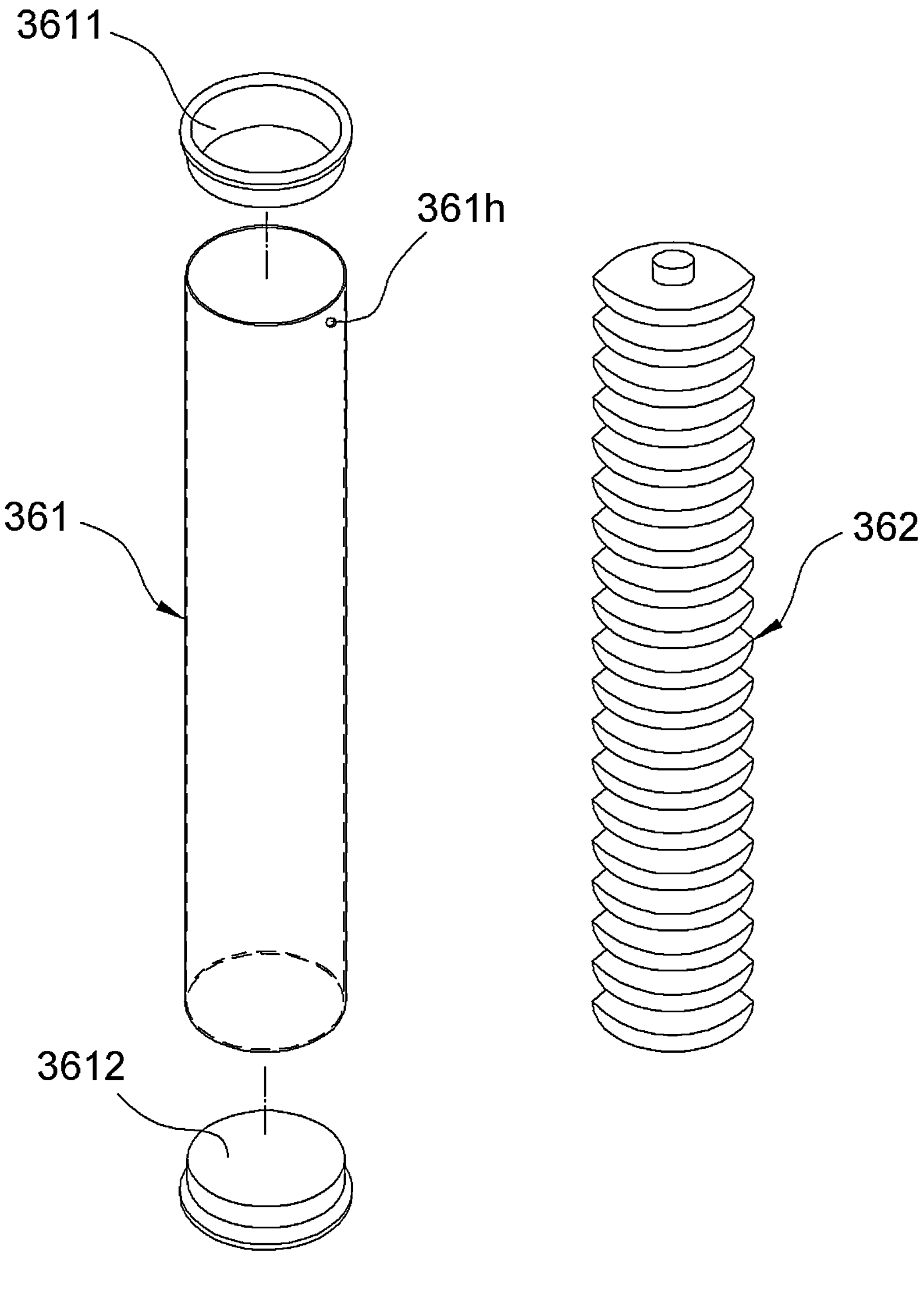
FIG. 9 is a view showing an example of a grease cartridge that is applicable to the grease container assembly of the battery-type automatic grease gun according to the embodiment of the present disclosure.

FIG. 1 is a perspective view showing a battery-type automatic grease gun according to an embodiment of the present disclosure, FIG. 2 is a sectional view showing the battery-type automatic grease gun according to the embodiment of the present disclosure, FIG. 3 is a sectional view showing a driving unit of the battery-type automatic grease gun according to the embodiment of the present disclosure, FIG. 4 is a sectional view showing a distribution unit of the battery-type automatic grease gun according to the embodiment of the present disclosure, FIG. 5 is a sectional view showing a grease container assembly of the battery-type automatic grease gun according to the embodiment of the present disclosure, FIG. 6 is a perspective view showing a spray nozzle of the battery-type automatic grease gun according to the embodiment of the present disclosure, FIG. 7 is a sectional view showing the spray nozzle of the battery-type automatic grease gun according to the embodiment of the present disclosure, FIG. 8 is a perspective view showing a grease nipple of the battery-type automatic grease gun according to the embodiment of the present disclosure, and FIG. 9 is a view showing an example of a grease cartridge that is applicable to the grease container assembly of the battery-type automatic grease gun according to the embodiment of the present disclosure.

As shown in FIGS. 1 and 2, the battery-type automatic grease gun according to one aspect of the present disclosure may include: a driving unit 100 including a motor 110 and a gear 120, and configured to provide a piston motion to a piston P; a distribution unit 200 extending from the driving unit 100, and into which the piston P is inserted to receive the piston motion; a grease container assembly 300 coupled to the distribution unit 200, and configured to accommodate grease; and a spray nozzle SN and a grease nipple N, which are a plurality of discharge ports connected to the distribution unit 200.

As shown in FIG. 3, the driving unit 100 may include the motor 110 and the gear 120, and provide the piston motion to the piston P.

The driving unit 100 may include a battery pack 130 for driving the motor 110. A battery may be fastened to a lower end of the driving unit 100 of the battery-type automatic grease gun according to one aspect of the present disclosure in a slide structure, so that 1) when the battery-type automatic grease gun is directly connected to an equipment power source, or when the battery is used, an upper portion of a power source direct connection-type adapter or a refillable battery may be configured to be identical to the slide structure of the lower end portion of the battery-type automatic grease gun so as to be easily replaced. 2) When a battery from another manufacturer is to be used, a slide-type adapter having a structure in which the battery and the lower end portion of the grease gun may be fastened may be used. Accordingly, a power of the battery-type automatic grease gun according to one aspect of the present disclosure may be used without being restricted in any case.

Meanwhile, the driving unit 100 may further include a grease gun switch 140 for controlling driving.

The motor 110 may transmit a rotational power to the gear 120 disposed on an upper portion of the motor 110. The motor may be a brushless motor, and the gear 120 may be configured as a multi-stage planetary gear. The gear 120 may include a a sliding gear 122, and the sliding gear 122 may convert rotational motion of the motor 110 and the gear 120 into a reciprocating motion to transmit the reciprocating motion to the piston P.

A controller 100C (not shown) may be provided at specific positions inside and outside the driving unit 100. The controller 100C may refer to a control unit.

The battery-type automatic grease gun according to one aspect of the present disclosure may use the brushless motor 110 and the multi-stage planetary gear 120 to adjust the number of times the grease gun is s driven, and may enable a predetermined discharge amount of grease to be discharged at a predetermined time through the controller 100C (not shown).

The battery-type automatic grease gun according to one aspect of the present disclosure may also adjust a position of a portion in which the piston P is driven. Accordingly, a position in which the grease is sucked may be adjusted to vary, and a discharge amount or a stroke may vary, so that the grease may be discharged at an appropriate discharge amount for various purposes.

The driving unit 200 may doubly use the multi-stage planetary gear 120 and the sliding gear 122 so as to maintain a maximum discharge pressure according to adjustment of RPM. 1) The multi-stage planetary gear 120 may be fastened to a grease gun main body, and the sliding gear 122 that operates a grease gun piston may be additionally inserted into an upper end portion of the grease gun, so that a torque of the grease gun may be maximized. The number of rotations of the grease gun may vary according to selection of a grease gun mode by a user, and in this case, a predetermined pressure or more may be maintained.

As shown in FIG. 4, the distribution unit 200 may extend from the driving unit 100, and the piston P may be inserted into the distribution unit 200 to receive the piston motion.

The grease container assembly 300 may be coupled to a lower portion of the distribution unit 200. The distribution unit 200 may have a grease suction space 210S formed in a direct upper portion of the portion to which the grease container assembly 300 is coupled. Meanwhile, the grease suction space 210S may communicate a main pipe 220S, and the piston P may push the grease of the grease suction space 210S into the main pipe 220S through the reciprocating motion.

The main pipe 220S may extend for a predetermined section, and may be divided into a first distribution pipe 230S and a second distribution pipe 240S. In more detail, the first distribution pipe 230S may extend in a longitudinal direction of the main pipe 220S, and the second distribution pipe 240S may extend upward in a vertical direction with respect to the main pipe 220S.

The first distribution pipe 230S may be a pipe connected to the spray nozzle SN, and may include a first distribution pipe coupling portion 232 formed on an inner wall of the first distribution pipe 230S so as to be coupled to another member. The first distribution pipe 230S may have an expanded diameter as compared with the main pipe 220S. This is intended to provide a space in which the spray nozzle SN or the like is coupled. Accordingly, the first distribution pipe 230S may have an expansion taper surface 234 so as to have an expanded diameter as compared with the main pipe 220S. In this case, it would be appropriate for a member such as the spray nozzle SN coupled to the first distribution pipe 230S to be inserted only to a depth that does not allow contact with a portion in which the first distribution pipe 230S and the main pipe 220S are connected, that is, the expansion taper surface 234, so as not to block the pipe.

The second distribution pipe 240S may be a pipe connected to the grease nipple N, and may include a second distribution pipe coupling portion 242 formed on an inner wall of the second distribution pipe 240S so as to be coupled to another member. Meanwhile, the second distribution pipe 240S may extend upward in the vertical direction from the first distribution pipe 230S. When the second distribution pipe 240S extends from the first distribution pipe 230S, the grease in the main pipe 220S may enter the second distribution pipe 240S along the expansion taper surface 234 of the first distribution pipe 230S. The second distribution pipe 240S may have a space formed on an upper portion of the second distribution pipe 240S and having an expanded diameter as compared with a diameter of a region in which the second distribution pipe 240S is first connected to the main pipe 220S or the first distribution pipe 230S, and this is intended to provide a space for another member to be coupled. The grease nipple N may be connected via a grease check fitting GCF and a grease hose H, and the grease check fitting GCF may be connected to the second distribution pipe 240S.

Meanwhile, the distribution unit 200 may include a check-type air vent 250 configured to allow air inside the grease container assembly 300 to be discharge to an outside. The check-type air vent 250 may be preferably coupled in a direction perpendicular to the piston P. According to the battery-type automatic grease gun of one aspect of the present disclosure, the check-type air vent 250 may be formed in the direction perpendicular to the piston P at an upper end portion of the grease suction space 210S, and the check-type air vent 250 may have a check structure so as to operate only when the air is generated to discharge the air to the outside. In other words, in order to remove the air inside the grease container, which is generated during use, the check-type air vent 250 may be installed on an upper portion of the piston P and a direct upper portion of the grease suction space 210S, so that the air pockets generated in the grease container by a reciprocating operation of the piston P upon the operation of the piston P may be immediately discharged to the outside and identified with a naked eye.

As shown in FIG. 5, the grease container assembly 300 may be coupled to the distribution unit 200, and may accommodate grease.

The grease container assembly 300 may include: a grease container 310 having a space therein; a pulling member 320 formed inside the grease container 310; an elastic spring 330 formed outside the pulling member 320; and a follower 340 having a double seal structure and elastically supported by the elastic spring 330.

The grease container 310 may have a circular shape, and may have one side that is opened and an opposite side that is closed. The opened portion of the grease container 310 may be coupled to the distribution unit 200. The grease container 310 may be formed of a transparent or translucent material so that the remaining amount and the injection amount of grease may be recognized with a naked eye.

The pulling member 320 may be formed inside the grease container 310, and may pass through the closed portion of a lower portion of the grease container 310 so as to be exposed to the outside. A space of the pulling member 320 exposed to the outside of the grease container 310 may have a curved shape so as to be easily pulled by the user.

The elastic spring 330 may be fixed to the closed portion of the lower portion of the grease container 310, and may apply an elastic force upward.

The grease container assembly 300 may include a follower 340 having a double seal structure so as to enable use of grease cartridges 360 having different structures. The follower 340 having the double seal structure may include a first follower seal 341 and a second follower seal 342. Accordingly, the follower 340 having the double seal structure may be manufactured such that a grease follower seal may have a double structure of the first follower seal 341 and the second follower seal 342, so that even when one seal between the first follower seal 341 and the second follower seal 342 allows an air pocket, the remaining seal on a rear side may block the air pocket so as to prevent the air from being transferred to a grease filling portion.

The follower 340 having the double seal structure may be connected to the pulling member 320, and may be elastically supported by the elastic spring 330. In other words, the follower 340 having the double seal structure may have a characteristic of restoring toward an opened region of the grease container 310. Accordingly, the follower 340 having the double seal structure may continuously push the grease upward into the grease suction space 210S of the distribution unit 200. The follower 340 having the double seal structure may make the structure of the grease follower seal to have flexibility so as to enable use of different grease cartridges.

Accordingly, the follower 340 having the double seal structure may be used for various grease cartridges.

Meanwhile, the grease container assembly 300 may include a holder 350 to which a magnet 352 is attached. The holder 350 to which the magnet 352 is attached may be preferably coupled to an outer periphery of the grease container 310 in a ring shape.

As shown in FIG. 9, the grease container assembly 300 may be compatible with a 'grease-refillable cartridge 361' or a 'bulk cartridge 362'. However, the grease container assembly 300 is not limited thereto, and may also be compatible with a 'disposable cartridge'.

The 'grease-refillable cartridge 361' may have a transparent or translucent structure that is refillable a plurality of times, and may include an upper blocking cover 3611 and a lower blocking cover 3612. The upper blocking cover 3611 and the lower blocking cover 3612 may be drawn into the 'grease-refillable cartridge 361' for a predetermined section so as to block and completely seal an inner periphery of the 'grease-refillable cartridge 361'.

The 'grease-refillable cartridge 361' may include a cartridge air vent 361*h* configured to prevent the grease from being filled further when the grease is refilled by a predetermined amount or more at a position adjacent to the upper blocking cover 3611. The cartridge air vent 361*h* may have a shape of a hole formed through outer and inner peripheries of the 'grease-refillable cartridge 361', and may be preferably formed at a position that is not lower than a depth at which the upper blocking cover 3611 is drawn into the 'grease-refillable cartridge 361'.

A scheme of refilling the grease in the 'grease-refillable cartridge 361' may be a scheme of removing the upper blocking cover 3611 and the lower blocking cover 3612, inserting the 'grease-refillable cartridge 361' into the grease container with a portion that was coupled to the upper blocking cover 3611 facing upward, inserting the piston such as a grease refill follower into the 'grease-refillable cartridge 361', and pulling the piston to allow the grease to be drawn into the 'grease-refillable cartridge 361'. Meanwhile, when the grease is filled up to a height at which the cartridge air vent 361*h* is formed, an internal pressure of the 'grease-refillable cartridge 361' may be relieved through the cartridge air vent 361*h*, and the grease may no longer rise by the piston. Accordingly, the cartridge air vent 361*h* may be installed so that no more grease may be filled when a predetermined amount of grease is filled. In this case, when it is confirmed that the grease no longer rises by the piston, a lower portion of the 'grease-refillable cartridge 361' may be blocked with the lower blocking cover 3612. Then, after the piston of the grease recharge follower and the like is removed, when the upper blocking cover 3611 is fitted to the 'grease-refillable cartridge 361', the cartridge air vent 361*h* may be blocked by the upper blocking cover 3611, and the grease of the 'grease-refillable cartridge 361' may be prevented from leaking to the outside through the cartridge air vent 361*h*.

Meanwhile, the 'bulk cartridge 362' may be generally used by inserting the grease container into grease in the grease barrel, and directly sucking the grease into the grease gun container. In this case, foreign substances may be inserted, and a grease residue may remain in the barrel, which may cause difficulties in subsequent processing of the grease residue.

Meanwhile, the grease container assembly 300 of the battery-type automatic grease gun according to one aspect of the present disclosure may be used by directly refilling the grease from the barrel to the grease container 310 by using a barrel grease follower. Alternatively, when the grease cartridge is used, a seal for a commercial grease cartridge or a grease gun cartridge of the present disclosure may be used, or a seal having a structure that may be used in the bulk type may be formed.

In other words, the grease container 310 and the grease cartridge 360 of the container assembly 300 may be transparent or translucent containers, and the 'bulk cartridge' or the 'grease-refillable cartridge' may be used. The grease container assembly 300 may form a double-type follower seal 340 to prevent the grease from being transferred to a rear side of the follower seal, and the holder 350 into which a detachable magnet 352 is inserted may be provided at an outer periphery of the lower portion of the grease container 310 so as to allow the grease gun to be attached to the equipment.

The battery-type automatic grease gun according to one aspect of the present disclosure may include a spray nozzle SN and a grease nipple N, which are a plurality of discharge ports connected to the distribution unit 200.

The spray nozzle SN may be connected to the distribution unit 200. In detail, the spray nozzle SN may be connected to the first distribution pipe coupling portion 232 formed in the first distribution pipe 230S.

As shown in FIGS. 6 and 7, the spray nozzle SN may include a first nozzle body SN100, a second nozzle body SN200, and a rotation control member SN300.

The first nozzle body SN100 may be a tubular member in which a first nozzle body pipe SN110S is formed. A first nozzle body ball valve SN112 may be formed inside the first nozzle body pipe SN110S to control a reverse flow of the grease. The first nozzle body SN100 may include a first nozzle body first coupling portion SN120 and a first nozzle body second coupling portion SN130, which are formed on an outer periphery of the first nozzle body SN100. In this case, the first nozzle body first coupling portion SN120 may be coupled to the first distribution pipe coupling portion 232 of the first distribution pipe 230S. In addition, the first nozzle body second coupling portion SN130 may be coupled to the second nozzle body SN200. Meanwhile, a first nozzle body protrusion portion SN140 may be formed in a region between the first nozzle body first coupling portion SN120 and the first nozzle body second coupling portion SN130 on the outer periphery of the first nozzle body SN100. The first nozzle body protrusion portion SN140 may be a component for assisting in easily coupling the first nozzle body SN100 to the second nozzle body SN200 or the first distribution pipe 230S, and may be used to easily couple the first nozzle body SN100 to another member when the first nozzle body protrusion portion SN140 is held and turned by using a tool.

The second nozzle body SN200 may include a second nozzle body pipe SN210S formed inside the second nozzle body SN200. A second nozzle body coupling portion SN240 may be formed in the second nozzle body pipe SN210S, and fastening with the first nozzle body second coupling portion SN130 of the first nozzle body SN100 may be performed through the second nozzle body coupling portion SN240. Meanwhile, the second nozzle body pipe SN210S may be vertically penetrated upward so as to allow the SN300 to be inserted and coupled rotation control member thereto.

The rotation control member SN300 may be inserted into the second nozzle body pipe SN210S of the second nozzle body SN200 in the vertical direction so as to be rotatably coupled thereto. The rotation control member SN300 may have a cylindrical shape. Meanwhile, an upper portion of the rotation control member SN300 may be appropriately provided with a handle having a shape in which one end is drawn in and an opposite end is drawn out so as to have a direction indication function. The rotation control member SN300 may include a rotation control member pipe SN310S formed by penetrating from a side portion of a cylinder, and a spray nozzle SN320 may be formed in the rotation control member pipe SN310S. The spray nozzle SN320 may have a check valve function, and may have a structure having a reverse check function so as to perform a locking valve function when the spray nozzle SN320 is rotated 180 degrees by rotation of the rotation control member SN300.

According to the battery-type automatic grease gun of one aspect of the present disclosure, the spray nozzle SN may be installed in the first distribution pipe 230S so that a predetermined discharge amount of grease having a discharge pressure or more may be directly airless-sprayed into the main pipe 220S, the first distribution pipe 230S, and the second distribution pipe 240S. If necessary, a pipe may be used so that the spray nozzle SN may be installed at an end of the pipe. In other words, the spray nozzle SN may be used by directly connecting the spray nozzle SN to the first distribution pipe coupling portion 232 depending on grease spraying purposes, or may be used by connecting a pipe having a predetermined length to the first distribution pipe coupling portion 232 and fastening the spray nozzle SN to an end of the pipe.

The grease nipple N may be connected to the distribution unit 200 via the grease check fitting GCF and the grease hose H.

The grease check fitting GCF may be coupled to the second distribution pipe coupling portion 242 formed in the second distribution pipe 240S. A grease check fitting ball valve GCFB may be formed inside the grease check fitting GCF so as to control a reverse flow of the grease.

The grease hose H may be connected to an opposite side of a portion in which the grease check fitting GCF is coupled to the second distribution pipe 240S, and the grease nipple N may be connected to an end of the grease hose H.

As shown in FIG. 8, the grease nipple N may preferably have a push-and-lock function. The push-and-lock function may refer to a function that allows immediate fastening through pushing toward a connection target injection port. In addition, it may be appropriate for the grease nipple N to have a structure in which the grease injection is blocked when the grease nipple N is not connected to a specific location, and the grease injection is possible when the grease nipple N is connected to the specific location. A grease nipple of a known technology may be used as the grease nipple having the push-and-lock function. In more detail, a "grease injection nipple" of Korean Patent Registration No. 10-1884703 (Aug. 30, 2018) filed by the applicant of the present disclosure or a grease nipple having a structure that is partially modified therefrom may be used.

In addition, aside from the above grease nipples, all push-and-lock grease nipples having a structure in which grease injection is blocked when the grease nipple is not connected to a specific location, and immediate fasting is possible through pushing toward a connection target injection port may be applied.

Meanwhile, according to a battery-type automatic grease gun of another embodiment of the present disclosure, the driving unit 100 may include a breaker operation signal connector 150 configure to operate the grease gun in a 'breaker operation mode' when a breaker operation signal is connected, and cancel grease injection when the breaker operation signal is disconnected.

In this case, the breaker operation signal may refer to a signal transmitted to the breaker operation signal connector 150 according to an action such as stepping on a pedal or the like installed on the equipment or the like by an equipment operator. For example, when folding or unfolding a specific region of the equipment, or when increasing or decreasing a length of a specific region of the equipment, the equipment operator may perform manipulation by stepping on a pedal or the like, and the breaker operation signal may refer to a signal transmitted by recognizing an action such as stepping on a pedal. A time point at which the specific region of the equipment is folded or unfolded or a time point at which the length of the specific region of the equipment is increased or decreased may a time point at which the grease has to be injected to the region of the equipment.

The 'breaker operation mode' may refer to an operation mode in which the grease is discharged through the second distribution pipe 240S, and refer an operation mode in which the grease is injected to the grease nipple N via the grease check fitting GCF and the grease hose H. In the 'breaker operation mode', the grease may be discharged only when the operation signal is input to the breaker operation signal connector 150, and a small amount of grease may be injected to the equipment whenever the operation signal is input. In the 'breaker operation mode', the grease gun may be driven at a speed of approximately 5 to 10 rpm so as to discharge the grease at a speed of 5 cc/min. In the 'breaker operation mode', the grease may be discharged only when the breaker operation signal is input. In this case, when the user connects the breaker operation signal connector 150 to the equipment and attaches the grease gun to a vehicle body or the like with a magnet, a signal may be autonomously transmitted so as to discharge the grease to the specific region of the equipment whenever the breaker is operated, so that a work may be conveniently performed. Meanwhile, in the 'breaker operation mode', the spray nozzle SN may be preferably locked by turning the rotation control member SN300 of the spray nozzle SN by 180 degrees.

Meanwhile, a 'grease gun use mode' may be provided as an example of another operation mode of the battery-type automatic grease gun according to one aspect of the present disclosure, and the 'grease gun use mode' may refer to an operation mode in which the grease is discharged through the first distribution pipe 230S, and refer to an operation mode in which the grease is discharged through the spray nozzle SN or the like. In the 'grease gun use mode', the grease gun may be driven at a speed of approximately 180 to 220 rpm so as to discharge the grease at a speed of 70 to 150 cc/min. In this case, a pressure in the pipe inside the distribution unit 200 may be increased, which may facilitate spraying at a high pressure through the spray nozzle SN or the like. Meanwhile, the 'grease gun use mode' may be preferably used while the grease nipple N is separated from an injection location, and when the grease nipple N is separated from the injection location, the grease nipple N may also be blocked, so that the grease may be prevented from being discharged toward the grease nipple N.

A protocol for controlling the battery-type automatic grease gun according to one aspect of the present disclosure through the breaker operation signal connector 150 is as follows. 1) When the breaker is operated, the breaker operation signal may be generated, so that the signal may be connected to the breaker operation signal connector 150, and when the breaker operation signal connector 150 is fastened, the controller 100C (not shown) may recognize that the breaker is operated without any separate manipulation and operate the grease gun. 2) Alternatively, a vibration element may be inserted into the controller 100C (not shown) inside the grease gun, and a vibration detection controller configured to recognize that the breaker is operated when a vibration having a predetermined decibel dB or more is generated when the breaker is operated, and automatically control the grease gun may be mounted. 3) When the breaker operation signal connector 150 is disconnected or the vibration of the breaker disappears, the 'breaker operation mode' may be automatically released.

In the 'breaker operation mode', which is a hydraulic breaker grease injection application mode, the breaker operation signal connector 150 to which a separate breaker operation controller signal is connected may be inserted into a side surface of an upper end portion of the grease gun so as to automatically recognize that the breaker is operated when the breaker operation signal connector 150 is fastened to the equipment, so that the breaker may be operated without a separate manipulation switch. In addition, when the breaker operation signal connector 150 is disconnected, the 'breaker operation mode' may be automatically released. In the 'breaker operation mode', which is a breaker operating mode, a minimum amount of grease, which is preset by the user, may be continuously and automatically injected.

In this case, the grease nipple N of the battery-type automatic grease gun according to one aspect of the present disclosure may be a check-type quick nipple, the grease gun and the hydraulic breaker may be connected to each other through a high-pressure hose, a separate filter may be inserted into a front end of the grease nipple N of the hydraulic breaker, and a quick nipple-type grease nipple N may be used, so that grease pipes of a grease gun part and a breaker nipple part may be easily removed when removing the breaker.

Meanwhile, according to a battery-type automatic grease gun of another embodiment of the present disclosure, an LCD window LCD (not shown) may be installed on an upper front portion of the battery-type automatic grease gun. 1) The controller 100C (not shown) in which an LCD window LCD (not shown) is mounted in an upper front portion of the battery-type automatic grease gun may be installed, the controller 100C (not shown) may select an operation mode of the grease gun with a button switch, and an operation notification LED may be mounted in the controller 100C. 2) A set flow rate may be displayed through a separately attached flowmeter or the like, and when the grease is discharged by a set amount or more, the grease gun may be immediately and automatically stopped. 3) The controller 100C (not shown) may have a function of displaying an operation state of a specific mode, and an LED may be inserted in to the controller 100C in preparation for a nighttime work.

In addition, the battery-type automatic grease gun may further include a grease flowmeter (not shown), and the grease flowmeter (not shown) may automatically stop the grease gun in a case where discharge is performed by a preset capacity or more when a user sets a predetermined discharge capacity.

Meanwhile, an LCD window LCD (not shown) may be formed on a front upper end portion of the grease gun so that the user may select the 'grease gun use mode' and set a flow rate, and when it is confirmed through the grease flowmeter (not shown) that the grease is flowing at a flow rate exceeding the flow rate that is preset by the user, the controller 100C (not shown) may automatically stop the operation of the grease gun.

In this case, the button switch of the controller 100C (not shown) may be used to easily select a mode to be used so as to enable use of various modes such as a 'grease gun use mode' and a 'breaker operation mode', and a use mode may be displayed on the outside through a corresponding mode switch.

In other words, the grease flowmeter (not shown) may be installed to input a flow rate, and when discharge is performed at the input flow rate, the grease gun may be automatically stopped. Accordingly, the battery-type automatic grease gun according to one aspect of the present disclosure may minimize waste of the grease through the grease flowmeter (not shown).

In summary, the battery-type automatic grease gun according to one aspect of the present disclosure may have two discharge ports, and according to grease gun function selection and discharge port determination of the user, only one discharge port selected from the spray nozzle SN or the grease nipple N may be used, and the remaining discharge port may be automatically locked.

The first nozzle body ball valve SN112 may be inserted on a horizontal front side of the piston P of the battery-type automatic grease gun according to one aspect of the present disclosure, and the spray nozzle SN including the rotation control member SN300 and the spray nozzle SN320 having the check valve function may be fastened to an end of the first distribution pipe 230S so as to perform spraying, so that a pressure difference between a grease discharge pressure and a spray pressure, which occur at the same time, may be minimized. In addition, the spray nozzle SN320 may have a reverse check valve function when rotated 180 degrees so as to have a locking valve function when using another discharge port such as the second distribution pipe 240S. A push-and-lock grease nipple N having a special structure and having a grease locking valve function may be fastened to the second distribution pipe 240S. In this case, when the spray nozzle SN is used, the grease nipple N may automatically have the locking valve function. In other words, when one discharge port is used, the other discharge port may be locked, so that the grease gun may be used for multiple purposes.

The battery-type automatic grease gun according to one aspect of the present disclosure may be a complex function grease gun, and may selectively use 1) a grease gun function, 2) a grease spray function, and 3) a breaker-only grease injection function. In addition, the battery-type automatic grease gun according to one aspect of the present disclosure may refill the grease cartridge a plurality of times, and may use different types of grease cartridges. In addition, the battery-type automatic grease gun according to one aspect of the present disclosure may refill only a predetermined amount of grease in the grease cartridge. In addition, the battery-type automatic grease gun according to one aspect of the present disclosure may recognize the remaining amount of grease and the injection amount of grease inside the grease container or the grease cartridge with a naked eye. In addition, the battery-type automatic grease gun according to one aspect of the present disclosure may be detachably attached so as to facilitate storage or temporary placement of the gun on the equipment while the grease gun is in use. In addition, the battery-type automatic grease gun according to one aspect of the present disclosure may have two discharge ports, and each of the discharge ports may automatically perform a function thereof according to a selected grease gun mode. In addition, the battery-type automatic grease gun according to one aspect of the present disclosure may automatically inject the grease to the breaker and stop the injection when the breaker is operated or released without separate switch manipulation. In addition, the battery-type automatic grease gun according to one aspect of the present disclosure may use various direct-current and alternating-current rechargeable batteries from other manufacturers as grease gun driving power sources.

The battery-type automatic grease gun according to one aspect of the present disclosure may be economical since one equipment may be applied to all equipment and attachments having different types of grease, lubrication injection amounts, and injection periods. In other words, the battery-type automatic grease gun according to one aspect of the present disclosure may be applied to 1) a hydraulic breaker, 2) a crane and a cargo crane, 3) an excavator and a loader, 4) a rock drill machine, 5) other special mechanical equipment (construction and mining equipment), 6) a forklift and the like, and 7) other equipment, machine structures, or the like requiring grease spray.

Although the present disclosure has been described with reference to the accompanying drawings, the above description corresponds to merely one embodiment among various embodiments including the gist of the present disclosure, and is intended to enable a person having ordinary skill in the art to easily practice the present disclosure, so that it is clear that the present disclosure is not limited only to the embodiments described above. Therefore, the scope of the present disclosure is to be interpreted by the appended claims, and construed as encompassing all technical ideas within the scope of equivalents thereof obtained by change, substitution, replacement, and the like without departing from the gist of the present disclosure. In addition, it is clearly stated that some configurations in the drawings are exaggerated or reduced as compared with actual configurations in order to more clearly explain the configuration.

What is claimed is:

1. A battery-type automatic grease gun comprising:

a driving unit including a motor and a gear, and configured to provide a piston motion to a piston (P);

a distribution unit extending from the driving unit, the distribution unit including a main pipe and a grease suction space in fluid communication with the main pipe, and into which the piston is inserted to receive the piston motion;

a grease container assembly coupled to the distribution unit, and configured to accommodate grease; and a spray nozzle and a grease nipple, which are a plurality of discharge ports connected to the distribution unit, wherein the main pipe extends for a predetermined section and then further extends into a first distribution pipe, and a second distribution pipe extends from the first distribution pipe, wherein the first distribution pipe extends in a longitudinal direction of the main pipe and is connected to the spray nozzle, the spray nozzle being fastened to an end of the first distribution pipe and positioned forward of the piston in the longitudinal direction of the main pipe, wherein the second distribution pipe extends upward in a vertical direction from the first distribution pipe and is connected to the grease nipple, and wherein the distribution unit includes a check-type air vent configured to allow air inside the grease container assembly to be discharged to an outside, the check-type air vent being coupled to an upper end portion of the grease suction space in a direction perpendicular to the piston and configured to discharge to the outside air pockets generated in the grease container assembly by reciprocating operation of the piston.

2. The battery-type automatic grease gun of claim 1, wherein the driving unit includes a breaker operation signal connector configured to operate the grease gun in a 'breaker operation mode' when a breaker operation signal is connected, and cancel grease injection when the breaker operation signal is disconnected.

3. The battery-type automatic grease gun of claim 1, wherein the grease container assembly of the grease gun is formed of a transparent or translucent material, and the grease container assembly includes a holder to which a magnet is attached.

4. The battery-type automatic grease gun of claim 1, wherein the grease container assembly is compatible with a 'grease-refillable cartridge' or a 'bulk cartridge', the 'grease-refillable cartridge' has a transparent or translucent structure that is refillable a plurality of times, includes upper and lower blocking covers, and includes a cartridge air vent configured to prevent the grease from being filled further when the grease is refilled by a predetermined amount or more at a position adjacent to the upper blocking cover, and the grease container assembly includes a follower having a double seal structure so as to enable use of grease cartridges having different structures.

5. The battery-type automatic grease gun of claim 1, wherein the battery-type automatic grease gun further comprises a grease flowmeter, and the grease flowmeter is configured to automatically stop the grease gun in a case where discharge is performed by a preset capacity or more when a user sets a predetermined discharge capacity.

* * * * *